United States Patent [19]
Kirkby

[11] Patent Number: 6,145,005
[45] Date of Patent: Nov. 7, 2000

[54] COMMUNICATIONS SYSTEM

[75] Inventor: Paul Anthony Kirkby, Old Harlow, United Kingdom

[73] Assignee: Nortel Networks Limited, Montreal, Canada

[21] Appl. No.: 09/089,727

[22] Filed: Jun. 3, 1998

[30]     Foreign Application Priority Data

Jun. 4, 1997  [GB]  United Kingdom ................. 9711549

[51] Int. Cl.⁷ .......................... G06F 15/16; G06F 13/38
[52] U.S. Cl. ...................... 709/228; 709/241; 370/237
[58] Field of Search .................................. 709/200, 203, 709/223, 225, 239, 240, 249, 228, 241; 370/353, 352, 401, 230, 235, 238, 237; 705/32; 379/114, 115

[56]             References Cited

U.S. PATENT DOCUMENTS

| 5,303,297 | 4/1994 | Hillis | 379/114 |
|---|---|---|---|
| 5,420,914 | 5/1995 | Blumhardt | 379/114 |
| 5,504,744 | 4/1996 | Adams et al. | 370/232 |
| 5,610,910 | 3/1997 | Focsaneanu et al. | 370/401 |
| 5,802,502 | 9/1998 | Gell et al. | 379/114 |
| 5,828,666 | 10/1998 | Focsaneanu et al. | 370/401 |
| 5,828,737 | 10/1998 | Sawyer | 379/114 |
| 5,898,668 | 4/1999 | Shaffer | 370/230 |
| 5,948,069 | 9/1999 | Kitai et al. | 709/240 |

FOREIGN PATENT DOCUMENTS

| 0 781 010 A2 | 12/1995 | European Pat. Off. . |
|---|---|---|
| 2 311 439 | 3/1996 | United Kingdom . |
| 2 316 266 | 8/1996 | United Kingdom . |
| 2 315 190 | 7/1997 | United Kingdom . |

*Primary Examiner*—Mark H. Rinehart
*Assistant Examiner*—Marc D. Thompson
*Attorney, Agent, or Firm*—Lee, Mann, Smith, McWilliams, Sweeney & Ohlson

[57]             ABSTRACT

A communication system having (a) an access layer in which local access networks give access to entities, (b) a packet switching layer providing switched communication between the local access networks, and (c) a cut through layer providing guaranteed quality of service communication between the local access networks. The entities signal selection of the packet switching network and/or the cut through network to its access network. The cut-through network can be selected when the packet switching network is congested and the user attributes priority to the communication. Preferably the local access networks are arranged to transmit tariff data to user entities which are arranged to display tariff data for a cut-through network.

6 Claims, 3 Drawing Sheets

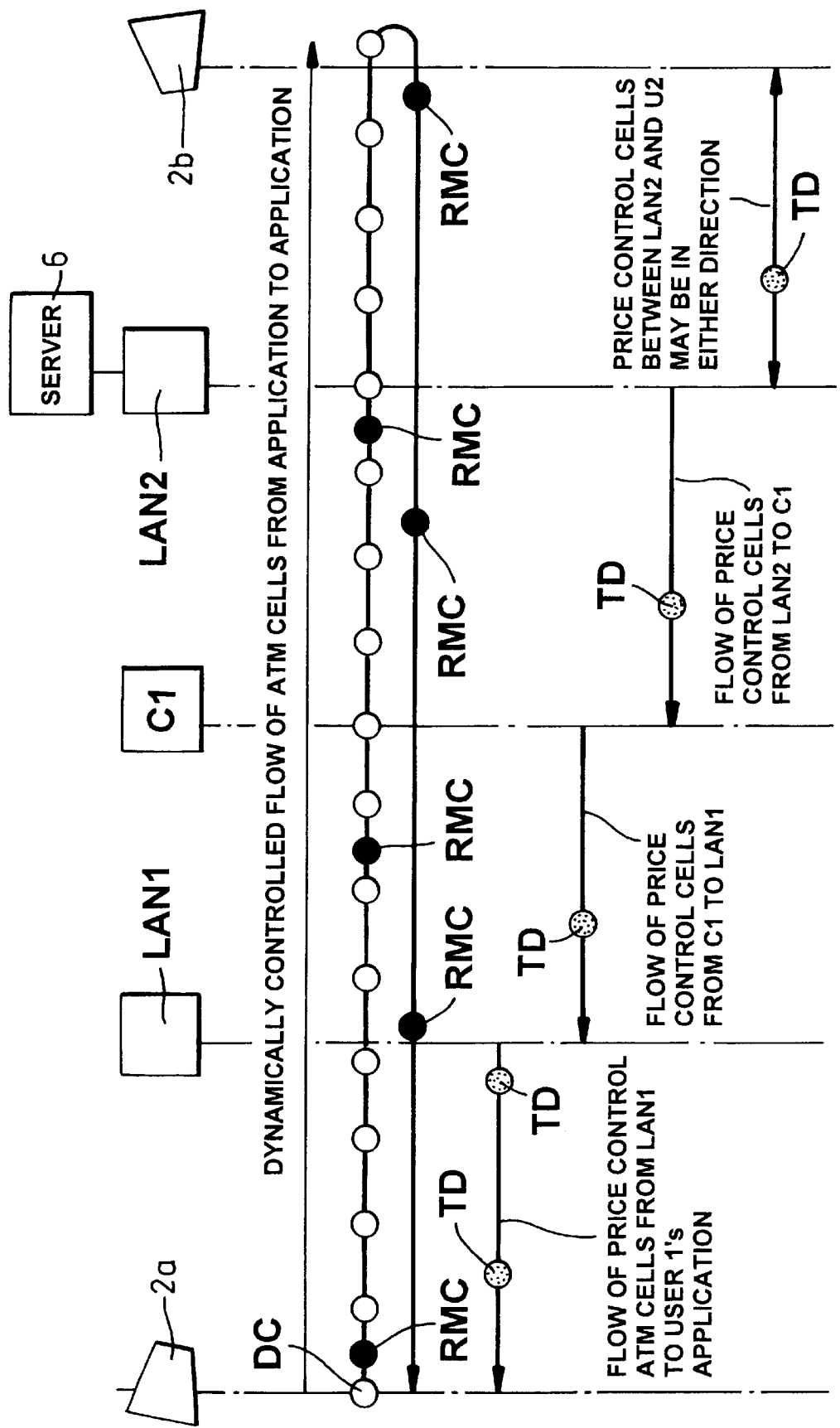

COMMUNICATIONS SYSTEM

This invention relates to communications networks and in particular to networks carrying traffic according to the Internet protocol (IP).

BACKGROUND OF THE INVENTION

A recent development in communications technology has been the rapid expansion of the Internet. Various techniques have been developed for delivering Internet services to customers. For example, a method of setting up cut-through connections is described in Specification No. EP-A2-0,781, 010. Reference is also directed to our specification No GB-A-2 311 439 which relates to dynamic call tariffing in a communications network.

For system users, the advantages of the Internet are its convenience and in particular the flat rate charges that are applied for Internet access and use. The disadvantage of the Internet is that it is a connectionless 'best effort' packet service and that under congestion conditions packets can be delayed, delivered in the wrong order or even discarded by the network. These problems can be mitigated by the service provider by purchasing sufficient bandwidth to accommodate anticipated demand. The advantage to the service provider is that such a service is simple to provide and bill for. However, with no transmission billing system, such as applies to conventional connection oriented networks, the service provider has the difficult task of estimating the minimum amount of expensive bandwidth that must be purchased from the network operator to provide customers with an acceptable quality of service.

SUMMARY OF THE INVENTION

An object of the invention is to minimise or to overcome the above disadvantage.

A further object of the invention is to provide an arrangement and method for alleviating congestion in an IP network.

According to a first aspect of the invention there is provided a communication system, comprising: an access layer in which a plurality of local access networks give access to entities; a packet switching layer for providing packet switched communication between the local access networks; and a cut through layer capable of providing guaranteed quality of service communication between the local access networks; entities being arranged to signal selection of the packet switching network and/or the cut through network to its access network.

According to a further aspect of the invention there is provided a method of providing tariffing for communications in a network comprising an access layer in which a plurality of local access networks give access to user entities, a packet switching layer for providing packet switched communication between the local access networks, and a cut-through layer capable of providing guaranteed quality of service communication between the access networks, the method comprising; transmitting from a said user entity to a respective said access network data selecting a desired bandwidth for communications; determining a charging tariff for said desired bandwidth; and transmitting to the user entity data indicative of said tariff.

The cut through network can be selected when the packet switching network is congested and the user attributes priority to the communication. The entities include internet users and internet services.

Preferably, the local access networks are arranged to transmit tariff data to user entities which are arranged to display tariff data for the cut through network.

Most preferably, the tariff is bandwidth related and each said user entity is arranged to transmit data to its access network to select a desired band width for communications.

In one example, a network resource which generates charges, includes means arranged to determine dynamically the charging rate for its use, and to transmit the charging rate or tariff data representing a proposed or actual charging rate or tariff, or a change or proposed change thereto, through the network before and/or during the call to the entity or entities liable to the resource for the charges.

In that example, the tariff may relate the charging rate to share of the resource reserved for an/or utilised by the entity.

BRIEF DESCRIPTION OF THE DRAWINGS

A preferred embodiment of the invention will now be described, by way of example, with reference to accompanying drawings, in which:

FIG. 3 illustrated data flow through the cut through layer between two users.

DESCRIPTION OF PREFERRED EMBODIMENT

Figure 1:
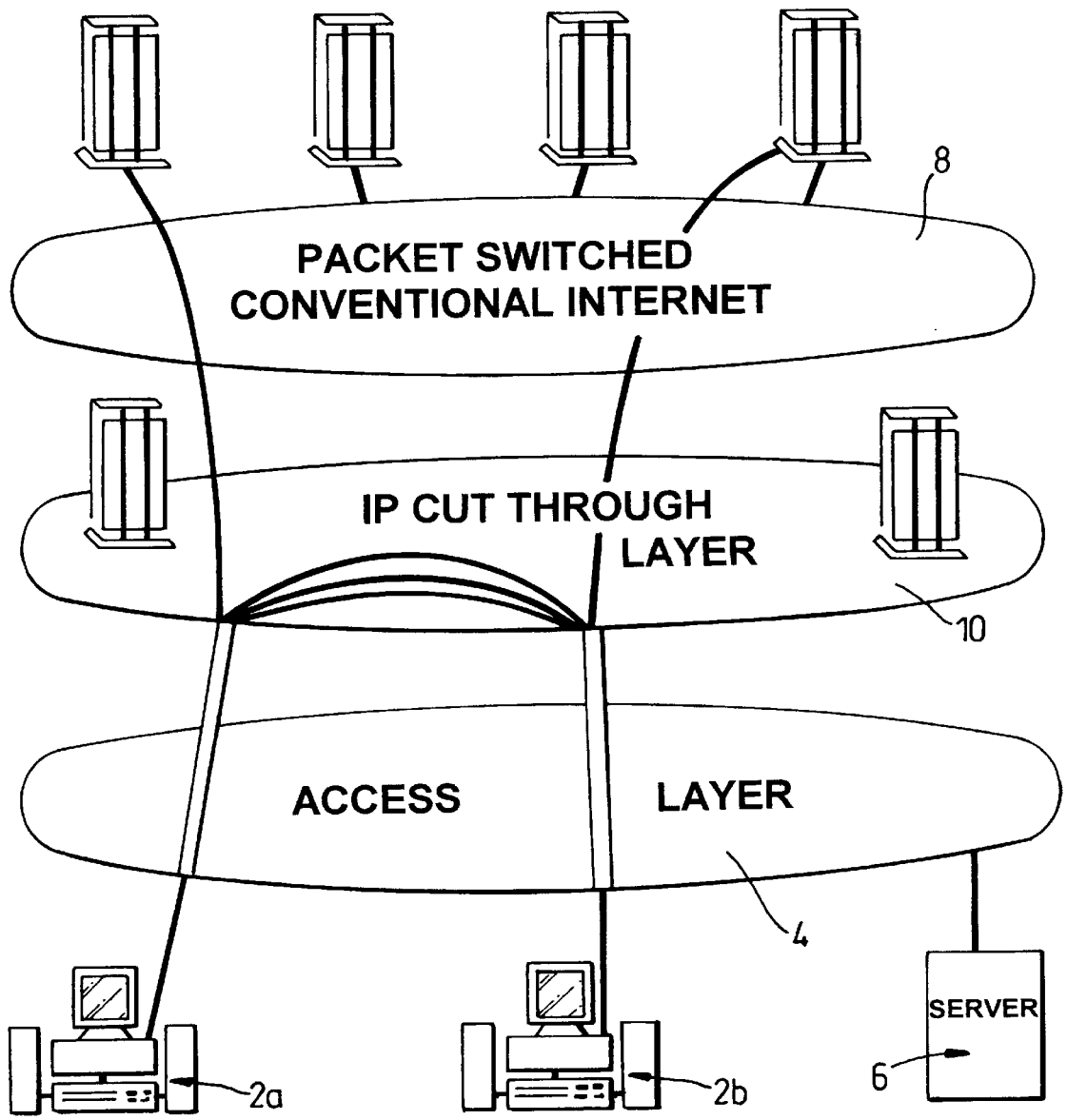
FIG. 1 is a schematic diagram of a communication system embodying the invention.

Referring to the drawings, user terminals 2a and 2b, and Internet server 6 are connected to local access networks in an access layer 4. The access layer provides communication with a conventional packet switched internet layer 8 through which users can communicate with other users and servers.

It is a common experience that the Internet becomes congested at times. Real time communication of voice and video have high band width requirements and suffer when the network becomes congested. To alleviate such problems, a cut through layer 10 is provided in which quality of service is guaranteed. Thus bandwidth may be reserved for communication through the cut through layer. The cut through layer may be embodied in a connection type network, in an asynchronous network where n can be varied to vary band width.

The cut through network comprises a number of entities. Users 2a and 2b are entities which may be connected to other entities by the network. Domains in the network are entities comprising a group of one or more network elements 12 which generate charges for their use. Thus a call transmitted through some of the network elements of a domain will attract charges. A domain may include or consist of an internet server. Services may include, for example, a public bulletin board, one or more data bases, the provision of film, a retail sales outlet, etc. A domain may include or consist of transmission elements, switching networks etc. being, for example a local access network LAN1 or LAN2 or a long distance carrier network C1.

FIG. 3 illustrates a call between users 2a and 2b.

Communication between users 2a and 2b and their respective local access network LAN1 or LAN2 is in multiples of 64 kbit/s synchronous channels. Narrow band communications, requiring one 64 kbit/s channel may provide, for example a telephone call. Broader band circuits containing a plurality of 64 kbit/s channels may be required for rapid data communication and, more especially, for video. Video may be wanted for transmission of film or television type material or for video conferencing. To transmit voice plus video of VCR quality requires a bandwidth of about 2 Mbit/s. Voice plus poor quality video may be provided in a bandwidth of 128 kbit/s (2×64 kbit/s channels). Voice plus moderate quality video may be transmitted in a bandwidth of 384 kbit/s (6×64 kbit/s channels). That n×64 kbit/s data can be transferred by a stream of ATM cells or data packets.

The call is carried between local access network LAN1 and local access network LAN2 by carrier network C1.

Data cells DC which carry the information user 2a wants to coney to user 2b are transported along a virtual circuit through the ATM network C1 and arrive with their order preserved and with delays acceptable to voice and video communication. Interspersed between the data cells DC, resource management cells RCM are sent over the same route as the virtual circuit. The resource management cells contain rate control information. In an n×64 kbit/s synchronous network, the resource and tariff management information would be sent over separate data channels using ISDN systems. In the standard ABR protocol, each domain which provides the virtual circuit monitors its own utilisation. In the event that the domain becomes unacceptably congested it processes the resource management cells to specify a lower rate. The resource management cells, having reached the application belonging to user 2b, which may also process them to specify a lower rate, are returned on a return virtual circuit to the application belonging to user 2a. The sending application belonging to user 2a is obliged to reduce the rate as specified.

This system of bandwidth control can remain in place in a network embodying the invention and would operate as an override in the event that large numbers of users decided they would pay the premium for broadband communication in the event of, for example, a major disaster.

In addition, or perhaps alternatively, the network determines the charging rate for a call dynamically, dependent on a tariff relating the charging rate to the bandwidth reserved for an/or utilised by the call. Before a call is set up, data representing a proposed charging rate determined from the tariff and the requested bandwidth, or the tariff, is transmitted from the domain to the entity or entities which will be liable for the charges for the call. The charging rate or tariff data may be sent in the resource management cells RCM or may be sent separately. Thus the resource management cells may be used to reserve bandwidth for a call and the charging rate may be based on that reservation. Alternatively, or additionally, the tariff may reflect the actual bandwidth used by the call, and may thus reflect that the call is using less or more than the reserved bandwidth. To this end the charging rate or tariff data is transmitted during the call at least when a change is proposed or made. The charging rate or tariff data is transmitted by each domain to the entity or entities liable for the charges for the service provided by that domain. The service would be transmission through the domain in the case, say, of local access networks LAN1 and LAN2, and carrier networks C1 and C2. The service would relate to time logged on a database, for example, in the case of service provider SP. In some cases, the charging rate or tariff data will be transmitted towards the user originating the call. In other cases the charging rate or tariff data will be transmitted alternatively or additionally towards a service provider, e.g. in the provision of services similar to the 0800 type telephone services.

In general, transmitting data representing the tariff gives a user more information on which to base a decision regarding bandwidth usage. If, however, only charging rate data is transmitted, the user will know that the use of more than one 64 kbit/s channel will normally be more expensive and can adjust the required bandwidth before call set up, or during a call, until a suitable charging rate is obtained or the use of only one channel is obtained.

The intention behind transmitting the information is to allow the domain manager to adjust the tariff in order to limit congestion of network elements in the domain. To this end, each user application is adapted to display the charging rate or tariff information so that the user liable for the costs of the call can terminate the call if the tariff is judged too high, or can limit the bandwidth used in the call and modify the rate control information in the resource management cells RMC. Alternatively, software in the application can make these decisions based on a priority scale pre-agreed with the user or users network provider.

Thus in FIG. 3, the entity comprising carrier network C1 is liable to the domain comprising local access network LAN2 for charges for the service by local access network LAN2 of transporting the data to user 2b. Tariff data is therefore sent before establishment of the call from local access network LAN2 to carrier network C1. Local access network LAN2 may also charge for delivery to user 2b, in which case tariff data (which may be different) is transmitted also from local access network LAN2 to user 2b. An internet server 6 may transmit tariff data to local access network LAN2. The tariff determined by the tariff data transmitted from local access network LAN2 to carrier network C1 may reflect the tariff determined by tariff data received by the local access network LAN2 from user 2b or server 6.

Similarly, the entity comprising local access network LA1 is liable to the domain comprising carrier network C1 for the charges for the carriage of the call through the carrier network. Tariff data is therefore sent before establishment of the call from carrier network C1 to local access network LA1. The tariff may reflect the tariff data received by the carrier network C1 from the local access network LA2.

The entity comprising user 2a is liable to the domain comprising local access network LAN1 for the charges for the carriage of the call through the local access network. Tariff data is therefore sent before establishment of the call from carrier network C1 to local access network LA1. The tariff may reflect the tariff data received by the local access network LAN1 from the carrier access network C1.

Figure 2:
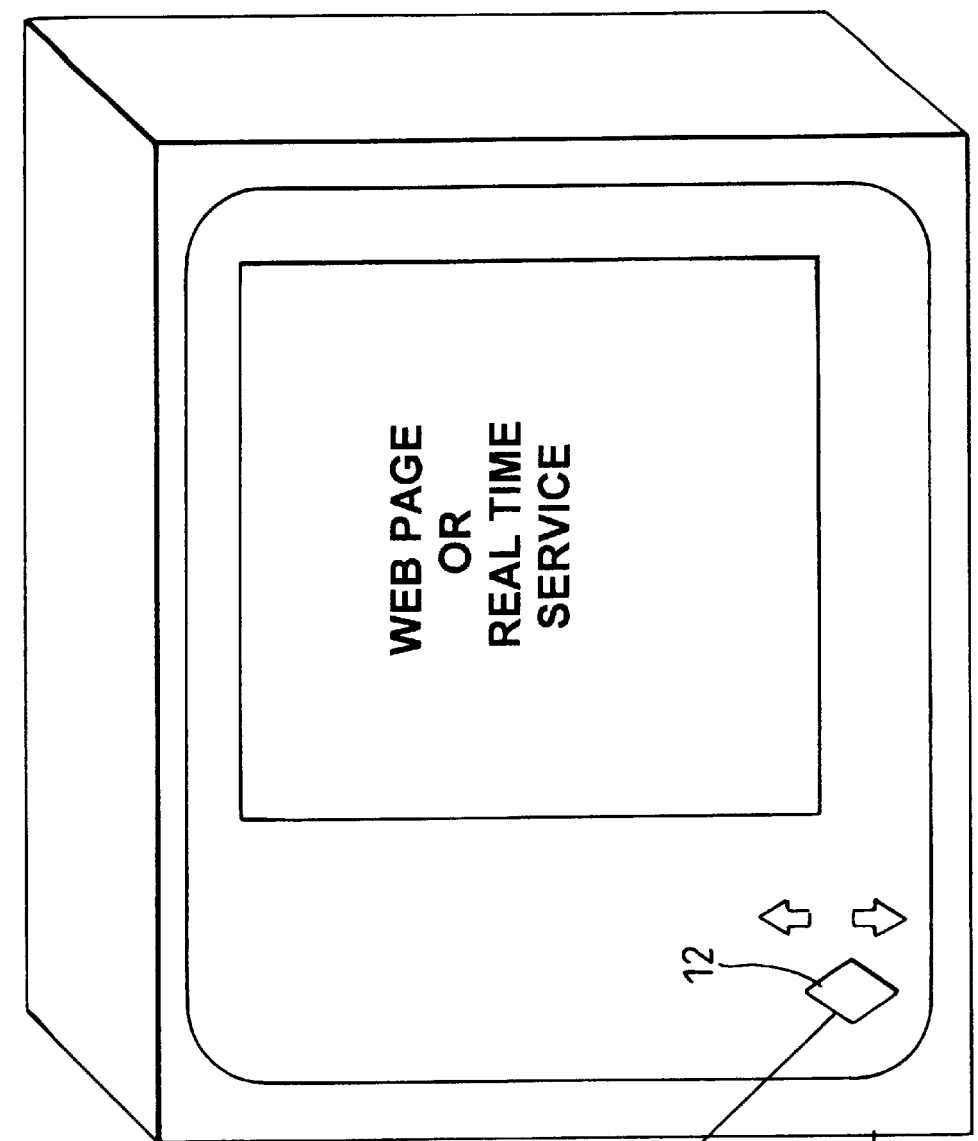
FIG. 2 is a pictorial view of a user terminal in the system of FIG. 1.

Referring to FIG. 2, the user application displays a button 12. If the button is clicked on with a mouse, the application displays a window containing bandwidth related tariff information received from the access network LAN1. If the user requires guaranteed quality of service, s/he is thus able to select a bandwidth at a price appropriate to the priority of the task. The selected bandwidth information is transmitted to the local access network LAN1 which communicates with the cut through layer to reserve a virtual connection of the required bandwidth.

Tariff data may be transmitted from a domain to the entity which is liable to it during a call if the domain manager decides to vary the tariff. The tariff may be increased, for example, in response to mounting congestion in the domain. Thus the degree of utilisation of the network elements may be directly related to the price, the tariff depending directly on the bandwidth reserved for or utilised by a call and the current utilisation of the network.

It will be understood that the above description of a preferred embodiment is given by way of example only and that various modifications may be made by those skilled in the art without departing from the spirit and scope of the invention

I claim:

1. A communication system, comprising: an access layer in which a plurality of local access networks give access to user terminals; a packet switching layer for providing packet switched communication between the local access networks; and a cut through layer capable of providing guaranteed quality of service communication between the local access networks and disposed intermediate said access layer and packet switching layer, said cut through layer incorporating domains comprising groups of one or more network elements arranged to generate tariffs for their use, said tariffs being determined dynamically and corresponding to a current congestion level, and wherein said domains are arranged to advertise to a user terminal a said tariff for use of the cut through layer for a communications session for that terminal whereby a user of that terminal can accept or decline use of the cut through layer for that communications session.

2. A communication system as claimed in claim 1, wherein the local access networks are arranged to transmit a said tariff to said user terminals, which terminals are arranged to display said tariff for use of the cut through network.

3. A communication system as claimed in claim 2, wherein the tariff is bandwidth related and each said user terminal is arranged to transmit data to its access network to select a desired bandwidth for a communications session.

4. A communication system as claimed in claim 1, and wherein the tariff incorporates a charging rate related to a share of the resource reserved for or utilised by the entity.

5. A method of providing tariffing for users of a communications network comprising an access layer in which a plurality of local access networks give access to user entities, a packet switching layer for providing packet switched communication between the local access networks, and a cut through layer capable of providing guaranteed quality of service communication between the local access networks and disposed intermediate said access layer and packet switching layer, said cut through layer incorporating domains comprising groups of one or more network elements arranged to generate tariffs for their use, the method comprising; determining within said cut through layer a tariff for use during a communications session of an element of a said domain in said cut through layer, said tariff corresponding to a current congestion level, and advertising said tariff to a user terminal whereby a user of that terminal can accept or decline use of the cut through layer for that communications session.

6. A method as claimed in claim 5 wherein the tariff is bandwidth related and each said user terminal is arranged to transmit data to its access network to select a desired bandwidth for a communications session.

\* \* \* \* \*